United States Patent
Pau et al.

(10) Patent No.: US 10,035,620 B2
(45) Date of Patent: Jul. 31, 2018

(54) DEVICE AND METHOD FOR THE CONTROLLED ORIENTATION AND/OR CONTROLLED ROTATION OF CONTAINERS

(71) Applicant: KHS GmbH, Dortmund (DE)

(72) Inventors: Norman Pau, Kleve (DE); Thomas Nitsch, Kleve (DE); Thomas Lelie, Kleve (DE); Josef Düpper, Bedburg-Hau (DE)

(73) Assignee: KHS GmbH, Dortmund (DE)

( * ) Notice: Subject to any disclaimer, the term of this patent is extended or adjusted under 35 U.S.C. 154(b) by 0 days.

(21) Appl. No.: 15/314,193

(22) PCT Filed: May 13, 2015

(86) PCT No.: PCT/EP2015/060554
§ 371 (c)(1),
(2) Date: Nov. 28, 2016

(87) PCT Pub. No.: WO2015/180959
PCT Pub. Date: Dec. 3, 2015

(65) Prior Publication Data
US 2017/0190455 A1 Jul. 6, 2017

(30) Foreign Application Priority Data
May 27, 2014 (DE) .................. 10 2014 107 427

(51) Int. Cl.
*B65C 9/04* (2006.01)
*B65C 9/06* (2006.01)
*B65G 47/244* (2006.01)

(52) U.S. Cl.
CPC .................. *B65C 9/04* (2013.01); *B65C 9/06* (2013.01); *B65G 47/244* (2013.01)

(58) Field of Classification Search
CPC ........ B65G 47/244; B65G 29/00; B65C 9/04; B65C 9/06
(Continued)

(56) References Cited

U.S. PATENT DOCUMENTS 5,192,392 A 3/1993 Peterson et al.
5,478,422 A * 12/1995 Bright ...................... B65C 3/16
156/351
(Continued)

FOREIGN PATENT DOCUMENTS

DE 26 23 818 12/1977
DE 30 22 343 12/1981
(Continued)

*Primary Examiner* — Douglas A Hess
(74) *Attorney, Agent, or Firm* — Occhiuti & Rohlicek LLP

(57) ABSTRACT

A container-orienting device includes container-holder groups, each having rotatable container-holders separated from each other by at least one rotatable container-holder from another container-holder group such that no two rotatable container-holders from a particular container-holder group are next to each other. The device also has a plurality of drives, each of which rotates only container holders from a corresponding container-holder group. The container holders are organized into container-holder sequences, each of which comprises equal numbers of container holders from different container-holder groups arranged in a particular order. These sequences following one another along the conveying direction.

18 Claims, 8 Drawing Sheets

(58) Field of Classification Search
USPC .......... 198/377.01, 377.1, 394, 411; 156/567
See application file for complete search history.

(56) References Cited

U.S. PATENT DOCUMENTS

| | | | | |
|---|---|---|---|---|
| 5,858,143 A * | 1/1999 | Bright | ..................... | B65C 3/16 |
| | | | | 156/218 |
| 6,398,006 B1 * | 6/2002 | Dault | ..................... | B65C 9/04 |
| | | | | 198/377.01 |
| 6,805,182 B2 * | 10/2004 | Ballarotti | ................. | B65C 9/06 |
| | | | | 156/556 |
| 7,870,882 B2 * | 1/2011 | Panzetti | ................. | B65C 3/065 |
| | | | | 156/446 |
| 8,627,945 B2 * | 1/2014 | Kramer | .................... | B65C 9/06 |
| | | | | 198/470.1 |
| 9,695,029 B2 * | 7/2017 | Clusserath | ............. | B67C 3/242 |

FOREIGN PATENT DOCUMENTS

| | | |
|---|---|---|
| DE | 60 2004 002 632 | 8/2007 |
| EP | 1 167 213 | 1/2002 |
| GB | 2 091 201 | 7/1982 |
| WO | WO2010/081516 | 7/2010 |

\* cited by examiner

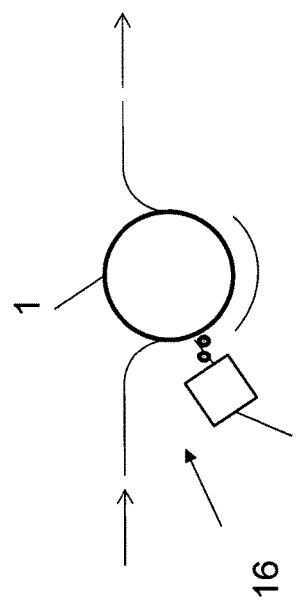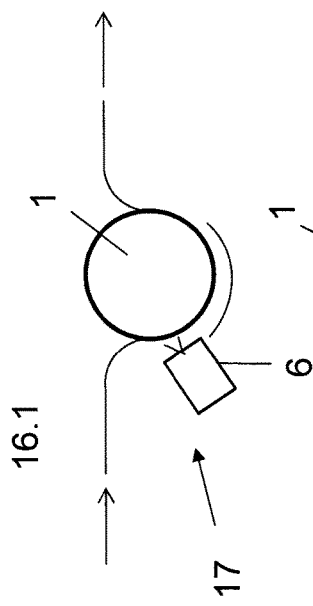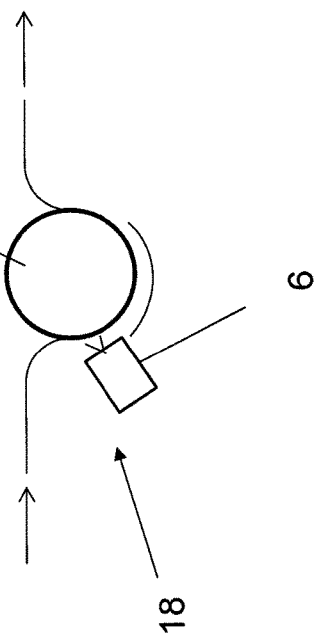

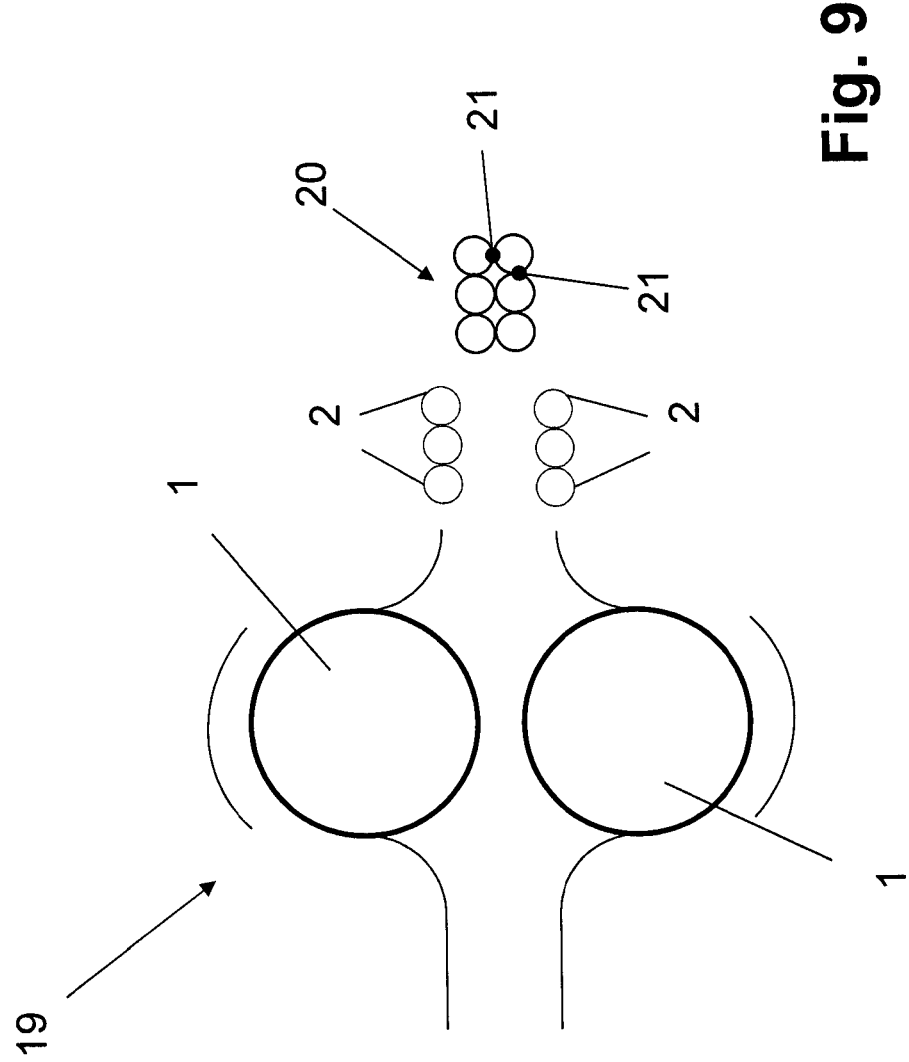

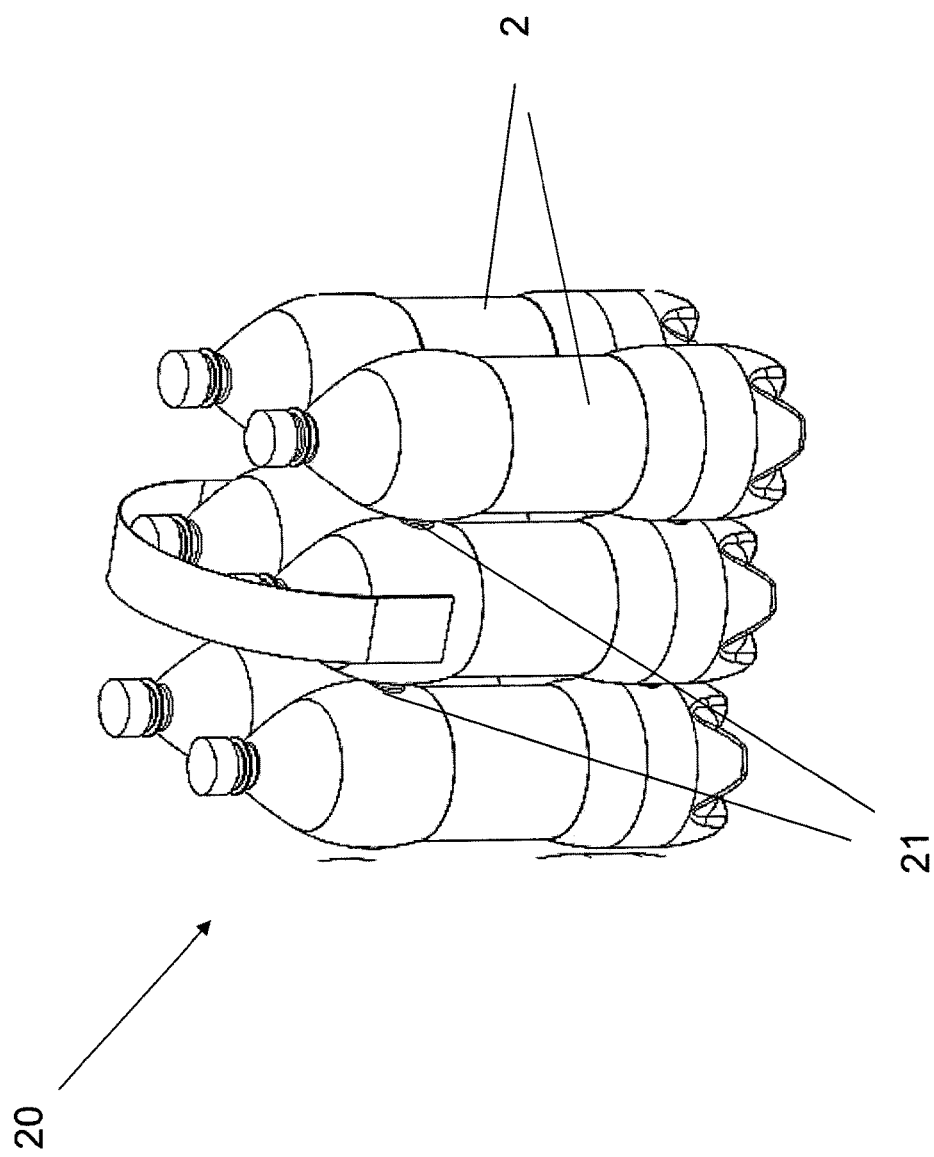

DEVICE AND METHOD FOR THE CONTROLLED ORIENTATION AND/OR CONTROLLED ROTATION OF CONTAINERS

RELATED APPLICATIONS

This is the national stage under 35 USC 371 of PCT/EP2015/060554, filed May 13, 2015, which claims the benefit of the May 27, 2014 priority date of German application DE 102014107427.0, the contents of which are herein incorporated by reference.

FIELD OF INVENTION

The invention concerns container handling, and in particular, rotation of containers.

BACKGROUND

It is known for labeling machines to be provided on the periphery of a rotor that can be driven to rotate about a vertical machine-axis with a plurality of container holders, each of which holds a container that is to be provided with a label or other form of decoration.

It is also known for the container holders to be configured with a rotary drive or rotary control so that, as the containers that are provided in the container holders move past a labeling or printing unit, they are oriented by controlled rotation about their container axis so as to assume a required orientation, for example relative to a container feature, and/or to rotate the containers about their container axes by a given angular amount as and/or after they pass the labeling or printing unit.

The controlled rotation of the individual container holders is brought about preferably by each container holder being provided with its own controllable rotary drive having a dedicated electrical actuator or servo motor, especially when these container holders are to be individually rotated. The large number of rotary drives alone involves a significant constructional effort.

SUMMARY

An object of the invention is to disclose a device for the controlled orientation and/or rotation of containers which, with reduced constructional complexity and a large number of container holders on a conveying element, enables at least those container holders which are located on the orientation segment of the orientation and conveying section extending between the container intake point and the container discharge point to be rotated under individual control, i.e. independently of one another, for the orientation and/or rotation of the containers about their container axis.

A particular advantage of the inventive device is that despite the large number of rotation-controlled container holders, only a small number of controllable rotary drives is required, specifically only a single controllable rotary drive with actuator or servo motor for a group of container holders, and yet a controlled individual rotation for the container holders of the different groups is possible, at least on an orientation segment of the orientation and conveying section. This means that each container holder of a group which (container holder) moves along the orientation segment can rotate in a controlled manner independently of the container holders of the other groups present in the same segment. In a particularly advantageous way, the electrical actuator or servo motors of the rotary drives can still be provided statically on a machine frame, i.e. they need not be moved together with the conveying element comprising the container holders. This also dispenses with the need for electric connections by way of sliding contacts in order to control and/or supply the actuator or servo motors.

The common rotary drive for the container holders of each container-holder group comprises, for example, a band drive, chain drive or belt drive connecting all container holders of the respective container-holder group with an actuator or servo motor assigned for the driving of that container-holder group. It is in particular also possible for the belt itself to form contact faces for the containers disposed in or at the container holders or for their enveloping surface. It is also possible for the container holders of each container-holder group of container holders to be connected for driving purposes to the related actuator or servo motor by way of a gear mechanism.

In the context of the invention, "rotary-driven container holders" are quite generally holders in or at which the containers are arranged as they are transported between the container intake point and the container discharge point and which are configured for a controlled rotary motion of the containers about their container axis, preferably about their vertical or substantially vertical container axis. In this context, rotary-controlled container holders are among other things turntables on which the containers stand upright on their base, grippers and container carriers including those for a suspended holding of the containers, and container transport pockets whose container contact faces are configured to rotate or circulate to provide a controlled rotation of the containers, and formed for example by at least one aligning belt, that can be driven to circulate.

In the context of the invention, "aligning the containers" means that the containers are rotated about their container axis in a controlled way so as to assume a desired orientation, for example relative to a container feature or to an element applied to the respective container, e.g. a label, print or adhesive coating etc.

In the context of the invention, "containers" are in particular cans, bottles, tubes, pouches, made of metal, glass and/or plastic, as well as other packaging media suitable for the filling of products, especially those which are liquid or viscous.

For the purpose of the invention the expressions "substantially" or "around" mean variations from the respective exact value by ±10%, preferably by ±5% and/or variations in the form of changes insignificant for the function.

Further embodiments, advantages and possible applications of the invention arise out of the following description of embodiments and out of the figures. All of the described and/or pictorially represented attributes whether alone or in any desired combination are fundamentally the subject matter of the invention independently of their synopsis in the claims or a retroactive application thereof. The content of the claims is also made an integral part of the description.

BRIEF DESCRIPTION OF THE DRAWINGS

The invention is explained in detail below through the use of embodiment examples with reference to the figures. In the figures:

FIG. 6-9 each show different examples of the use of the device; and

FIG. 10 shows a perspective view of a pack consisting of a plurality of containers.

DETAILED DESCRIPTION

Figure 1:
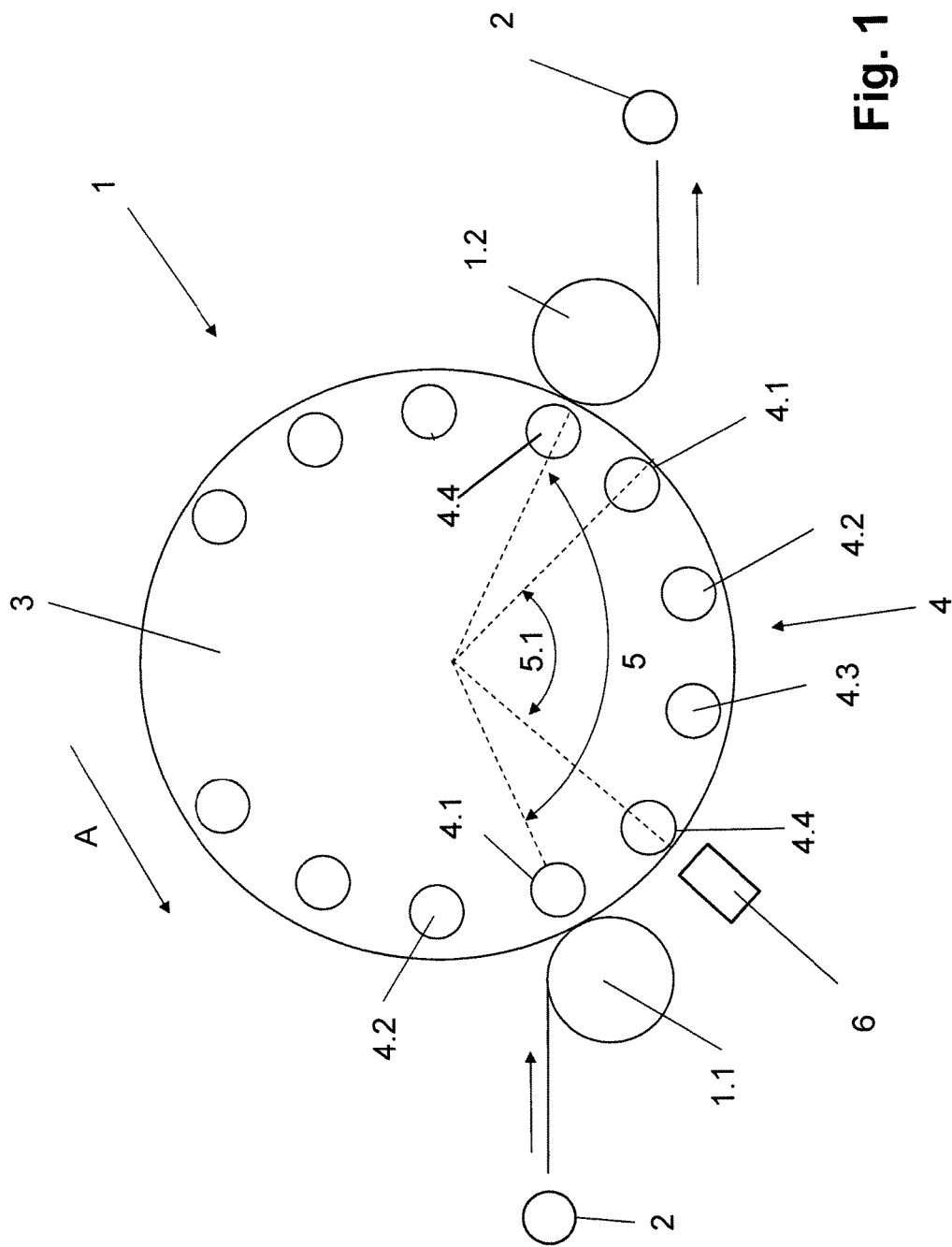
FIG. 1 shows a plan view of a device for the orientation of containers having a plurality of container holders arranged around the periphery of a rotor.
Figure 2:
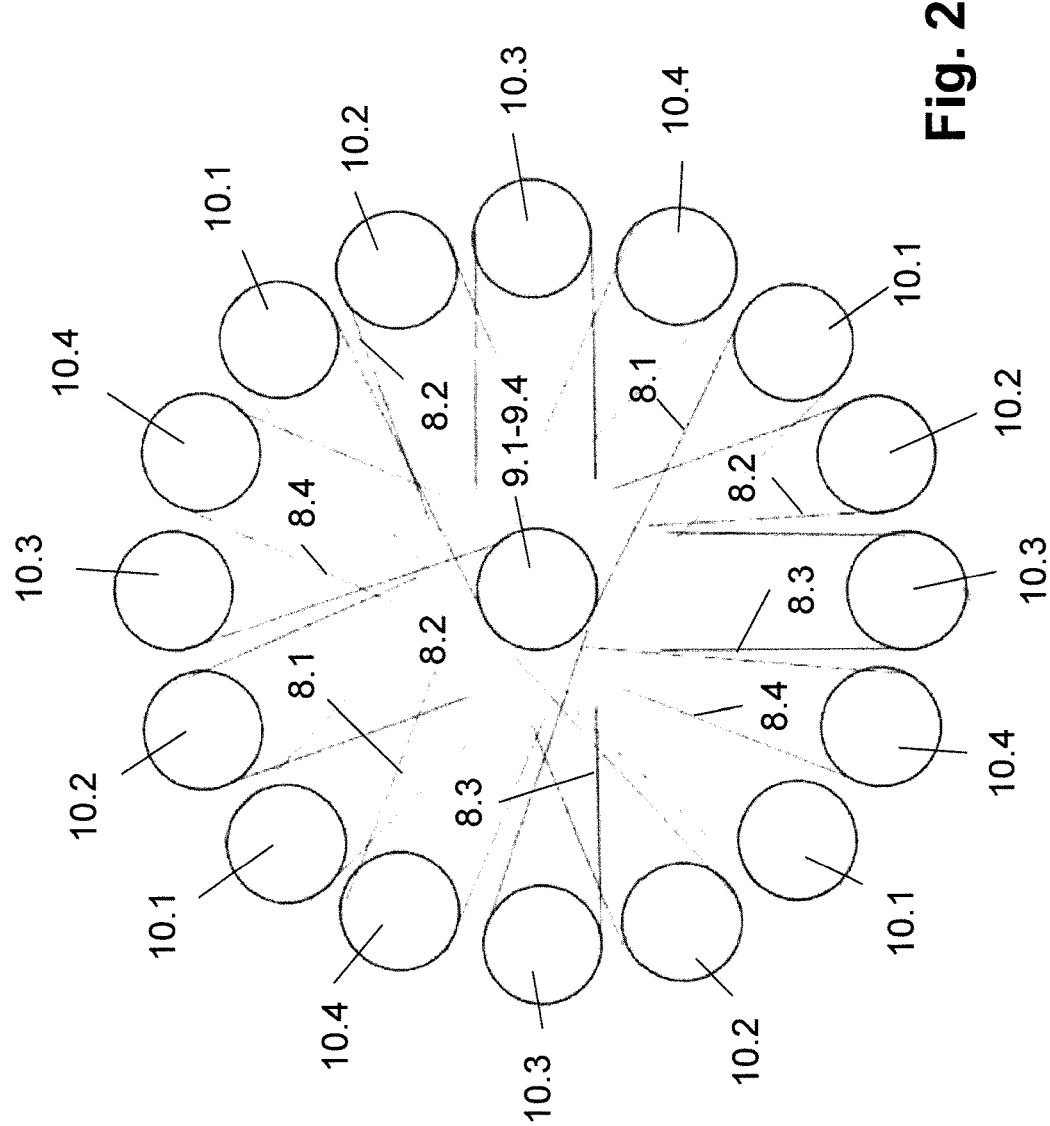
FIG. 2 shows a plan view of the toothed belts of a drive unit for the controlled rotation of the container carriers in FIG. 1.

FIG. 1 shows a device 1 for orientation, controlled rotation, and transportation of containers 2 on an alignment-or-orientation segment 5.1 of an orientation-and-conveying section 5. For brevity's sake, the alignment-or-orientation segment 5.1 will, be referred to as simply the "orientation segment." Also for brevity's sake, the orientation-and-conveying section 5 will be referred to as "conveying section."

Within the orientation segment 5.1, containers 2 are oriented in such a way that the containers 2 reach a desired orientation as a result of having been rotated on the orientation segment 5.1 by a desired angular amount. During alignment, this angular amount of rotation can vary from one container 2 to the next depending on the orientation in which the particular container 2 enters the orientation segment 5.1.

Figure 3:
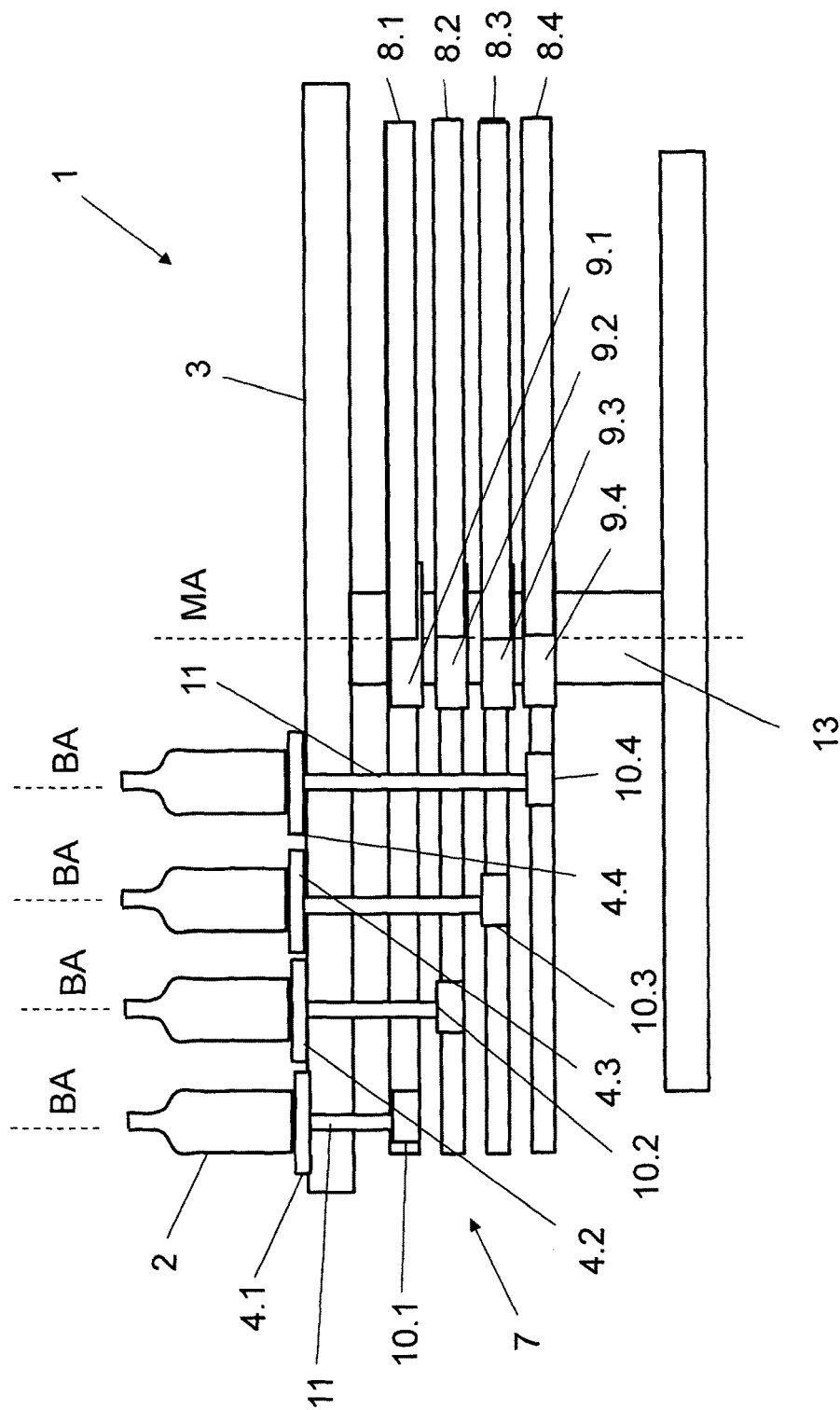
FIG. 3 shows a side view of the drive unit of FIG. 2.

The device 1 comprises a rotor 3 that rotates about a vertical machine axis MA along a rotation direction A. Container holders 4.1-4.4 on the rotor's periphery succeed one another along the rotation direction A. A constant angular distance, or pitch, separates each container holder 4.1 from its neighbors 4.2, 4.4. For simplicity's sake, the container holders 4.1-4.4 are represented as turntables on which the containers 2 stand upright on their bases. Each container holder 4.1-4.4 thus has a holder-axis BA about which it rotates, as shown in FIG. 3.

The container holders 4.1-4.4 are organized into container-holder groups. In the illustrated embodiment, there are four such container-holder groups. Each container-holder group has container holders associated with that container-holder group. The first container-holder group has first container holders 4.1. The second container-holder group has second container holders 4.2. The third container-holder group has third container holders 4.3. Ana the fourth container-holder group has fourth container holders 4.4. The number of container holders 4.1-4.4 is the same in all container-holder groups. In the illustrated embodiment, each container-holder group has four container holders.

The four container-holder groups are interleaved along the periphery of the rotor 3. Thus, a first container holder 4.1 is succeeded, by a second container holder 4.2, which is succeeded in turn by a third container holder 4.3, which is succeeded in turn by a fourth container holder 4.4, which is then succeeded by another first container holder 4.1 again. The container holders 4.1-4.4 therefore constitute a plurality of sequences 4 of container holders, with each sequence 4 comprising a container holder from each group. FIG. 3 shows one such sequence 4 comprising four container-holders 4.1-4.4, each of which comes from a different container-holder group.

Containers 2 are transferred individually through a container-intake 1.1 of the device 1 to one of the container holders 4.1-4.4. The containers 2 are removed from the container holders 4.1-4.2 at a container discharge 1.2 of the device 1. The angular range of rotary motion between the container-intake point 1.1 and the container-discharge point 1.2 defines the angular range of the conveying section 5.

A sensor 6 along the conveying section 5 observes the current orientation or position of a container holder 4.1-4.4. A signal provided by this sensor 6 causes the container-holder 4.1-4.4 to rotate the container 2 standing on it by an appropriate amount. An example of a sensor 2 is an electronic digital camera having a downstream system for computer-aided image processing. This rotation occurs while the container 2 is on the orientation segment 5.1. The angular extent of the orientation segment 5.1 along the rotation direction A is equal to the corresponding angular extent of a sequence 4 or to the sum of the pitch distances between container holders 4.1-4.4 of a sequence 4.

A useful feature of the device 1 is that a single rotary drive rotates ail container holders of a container-holder group, and only those container holders. This feature arises because the angular extent of the orientation segment 5.1 is at most equal to the angular range over which a sequence 4 extends. In the illustrated embodiment, the angular range of the rotor's rotational motion, which corresponds to the orientation segment 5.1, is around 90° or less.

A rotary drive effects individual controlled rotation of those container holders 4.1-4.4 that are located on the orientation segment 5.1. This rotary drive is provided independently for each container-holder group. The remaining container holders 4.1-4.4 of each container-holder group are necessarily co-rotated in the process.

FIG. 3 shows a rotary drive 7 that is provided in common for container holders 4.1-4.4. For each container-holder group, the rotary drive 7 comprises a corresponding end-lessly-circulating toothed-belt 8.1-8.4 that forms a closed loop. The toothed-belts 8.1-8.4 are disposed on different levels that are staggered relative to one another in the direction of the machine axis MA with each level corresponding to one of the container-holder groups.

Each toothed belt 8.1-8.4 is guided over a driving wheel 9.1-9.4 that corresponds to a corresponding one of the container-holder groups. The driving wheels 9.1-9.4 are all arranged coaxially with the machine axis MA. Each driving wheel 9.1-9.4 drives its corresponding toothed belt 8.1-8.4 over guide wheels and over driven wheels 10.1-10.4. Each driven wheel 10.1-10.4 drives a shaft 11 that is rotatably mounted in the rotor 3. Each shaft 11 rotates a container holder 4.1-4.4 about its holder-axis BA.

Figure 4:
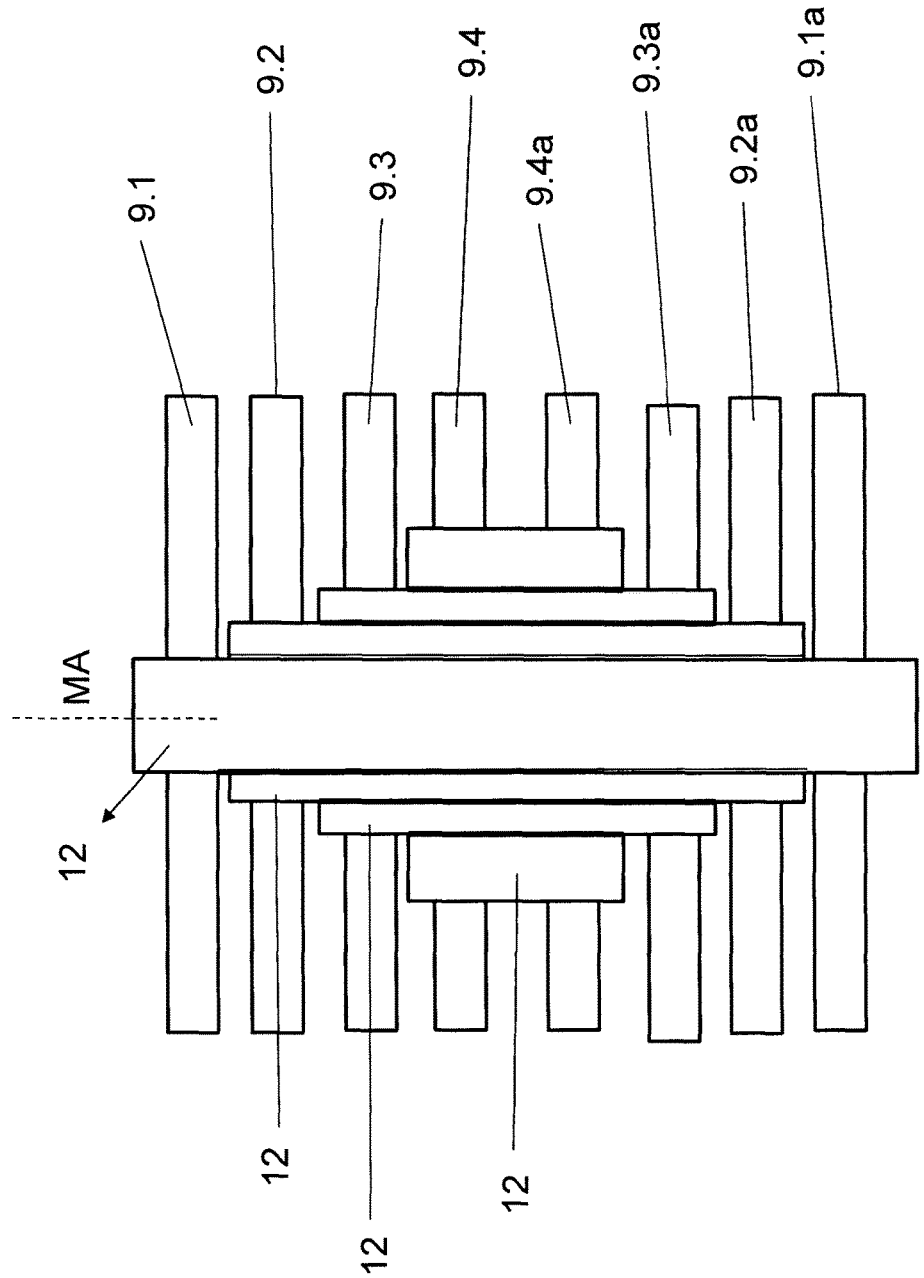
FIG. 4 shows an individual view of a plurality of toothed belt, wheels rotatably mounted about a common axis and driving toothed belts of the drive unit of FIG. 3.

Referring to FIG. 4, the driving wheels 9.1-9.4 are each provided on hollow shafts 12 that are coaxial with the machine axis MA. The shafts 12 partially surround each other concentrically and are mounted rotatably relative one another. Each shaft 12 has two associated wheels. One of them is the driving wheel 9.1-9.4 that drives the toothed belt 8.1-8.4. The other one is a toothed belt wheel 9.1a-9.4a that is driven by an individual actuator or servo motor that corresponds to one container-holder group.

As indicated in FIG. 3, the rotor 3 is rotatably mounted on a machine frame 13. This machine frame 13 also includes a rotor drive that rotates the rotor 3 about the machine axis MA and that drives the rotor 3 by way of a central shaft that is arranged coaxially with the machine axis MA. The hollow shafts 12 are arranged on this central shaft.

Figure 5:
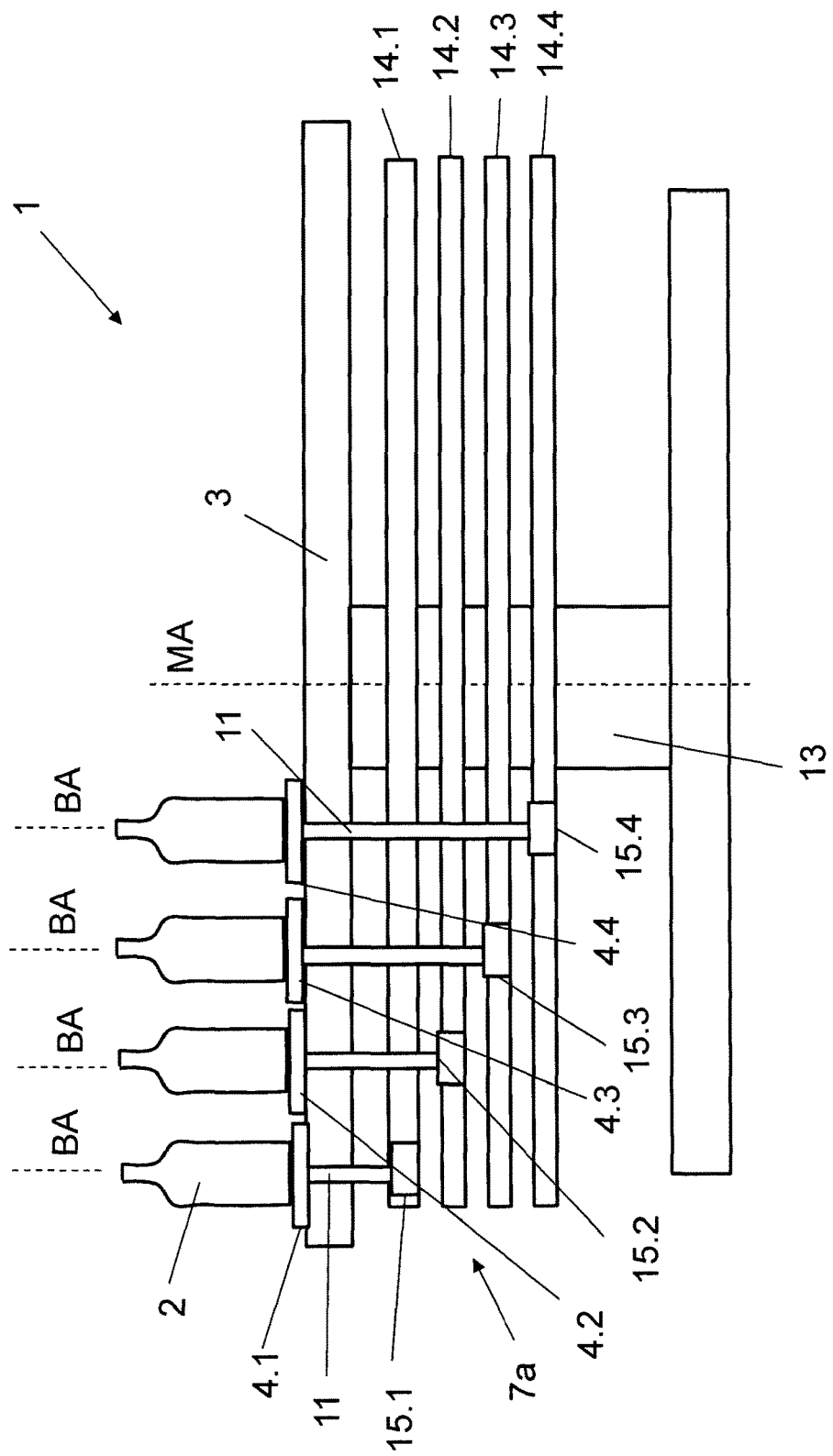
FIG. 5 shows a side view of a drive unit similar to that shown in FIG. 3 but with a plurality of ring gears and toothed wheels.

FIG. 5 shows an alternative rotary drive 7a similar to the rotary drive 7 shown in FIG. 3. The alternative rotary drive 7a includes first through fourth ring gears 14.1-14.4. Each ring gear 14.1-14.4 is individually rotatable about the machine axis MA by its own actuator or servo motor, which is provided coaxially with the machine axis MA. The ring gears 14.1-14.4 are staggered along a plurality of levels in the direction of the machine axis MA. Each ring gear 14.1-14.4 is associated with a container-holder group. Container holders 4.1-4.4 of a particular container-holder group are connected by a corresponding one of the toothed wheels 15.1-15.4 with a corresponding one of the ring gears 14.1-14.4 such that ail container holders 4.1-4.4 of a container-holder group rotate under control on the orientation segment 5.1 for the orientation and controlled rotation of container holders 4.1-4.4 and of the containers 2 with just a single actuator or servo motor provided for each container-holder group.

A particular advantage of the device 1 is that the required number of actuator or servo motors is significantly reduced. For example, in the illustrated embodiment, only four actuator or servo motors are needed for sixteen container holders 4.1-4.4. This considerably reduces the amount of control required.

FIGS. 6-10 show different uses for device 1.

FIG. 6 shows a device 1 that is part of a labeling machine 16 for affixing labels to a given region of the containers 2 with the aid of a labeling unit 16.1.

FIG. 7 shows the device 1 as part of a first unit 17 for the aligning of containers 2 that have already been provided with a decoration. The embodiment shown in FIG. 7 carries out subsequent transfer of aligned containers 2 to a downstream machine, for example to a machine for forming packs from a plurality of containers 2.

FIG. 8 shows a device 1 that is part of a second unit 18 for aligning containers 2 that have a polygonal cross-section, such as a square or rectangular cross-section, and for transferring the aligned containers to a downstream machine, such as a machine for forming packs from a plurality of containers 2.

The device 1 can also be used as part of a system 19, as shown in FIG. 9, for creating packs 20 of containers 2 by adhesively boding containers 2 to each other with adhesive coating 21. An example of such a pack 20 is shown in FIG. 10.

The system 19 includes first and second devices 1. The containers 2, through orientation and/or controlled rotation thereof as they traverse orientation segment 5.1, are provided with adhesive coatings 21 on required outer regions thereof. As shown in connection with the FIG. 10, these outer regions are offset from one another by 90° around the container's axis. In this embodiment, application of adhesive coatings 21 is effected on or directly after the orientation segment 5.1.

The container holders 4.1-4.4 need not be turntables. In some embodiments, the container holders 14.1-14.4 are container carriers or suspenders that suspend containers 2, for example neck holders. In other embodiments, the container holders 4.1-4.4 are container transport pockets whose container contact faces are configured so as to rotate or circulate for a controlled rotation of the containers. These are formed, for example, by at least one aligning belt or band that can be driven to circulate, for example by belts 8.1-8.4 or similar belts.

In the illustrated embodiment, the container holders 4.1-4.4 were provided on rotating rotor 3. In alternative embodiments, containers 2 move through the orientation and conveying section or through the latter's orientation segment standing upright on a conveyor belt. In these embodiments, the rotated container holders 4.1-4.4 include aligning belts arranged beside and/or above the conveyor belt.

Having described the invention, and a preferred embodiment thereof, what is claimed as new, and secured by Letters Patent is:

1. An apparatus comprising a device for controlled orientation and/or controlled rotation of containers, said device comprising a conveying element for moving the containers on an orientation and conveying section between a container intake point and a container discharge point in a direction of conveyance, a plurality of container holders that succeed one another in the direction of conveyance and that are rotation-controlled by drives so as to orient the containers by rotating or pivoting them about their container axes, wherein the container holders form at least two groups of container holders, wherein each group of container holders comprises at least two container holders wherein the container holders form at least two identical sequences that succeed one another in the direction of conveyance and in which container holders of different groups are interleaved with each other, and wherein a separate actuator or rotary drive by which container holders of the group concerned are rotated together under control is provided for each group of container holders.

2. The apparatus of claim 1, wherein the orientation and conveying section or a part of the orientation and conveying section forms an orientation segment, and wherein a length that the orientation segment extends in the direction of conveyance is equal or approximately equal to the length that the sequences of container holders each extend in the direction of conveyance and/or equal or approximately equal to the sum of the pitch distances of the container holders of a sequence of container holders.

3. The apparatus of claim 1, wherein the orientation and conveying section or a part of the orientation and conveying section forms an orientation segment, and wherein a length that the orientation segment extends in the direction of conveyance is at most equal to the length that the sequences of container holders each comprise in the direction of conveyance and/or at most equal to the sum of the pitch distances of the container holders of a sequence of container holders.

4. The apparatus of claim 3, wherein the length that the orientation segment extends in the direction of conveyance is less than the length that the sequences of container holders each extend in the direction of conveyance, and/or is less than the sum of the pitch distances of the container holders of a sequence of container holders.

5. The apparatus of claim 1, wherein each group of container holders is provided with a separate servo motor that is connected, for driving purposes, to the container holders of the group concerned by a band drive, chain drive or belt drive that is associated with the group concerned alone and/or by a gear mechanism that is associated with the group concerned alone.

6. The apparatus of claim 5, wherein the actuator or servo motor comprises, for each group of container holders, a separate drive wheel arranged coaxially with a machine axis for a band element, belt element or chain element of the belt or chain drive, and/or comprises, for each group of container holders a separate ring gear of the gear mechanism that is arranged coaxially with the machine axis.

7. The apparatus of claim 1, wherein the container holders are container carriers for a suspended holding of the containers.

8. The apparatus of claim 1, further comprising at least one sensor for detecting the rotational position of the container holders and/or of the containers for the controlling of the rotary motion of the container.

9. The apparatus of claim 1, wherein the conveying element is a rotor that can be driven to rotate about a vertical machine axis and on whose periphery the container holders are provided staggered at equal angular or pitch distances about the machine axis.

10. The apparatus of claim 1, further comprising a system with which adhesive coatings are applied to regions of the containers that assume a given orientation so as to combine a plurality of containers into a pack by way of the adhesive coatings, wherein said device is a constituent of said system.

11. The apparatus of claim 1, wherein said groups comprise a first group and a second group, wherein a container holder from said first group is adjacent to at least two containers holders of said second group.

12. The apparatus of claim 1, wherein said container holders are turntables forming support surfaces for said containers.

13. The apparatus of claim 1, wherein each group of container holders is provided with a separate actuator that is connected to the container holders of the group concerned by a drive selected from the group consisting of a band drive, chain drive, and a belt drive, wherein said drive is associated with the group concerned alone.

14. The apparatus of claim 1, wherein each group of container holders is provided with a separate actuator that is connected to the container holders of the group concerned by a gear mechanism that is associated with the group concerned alone.

15. The apparatus of claim 1, wherein the container holders comprise transport pockets.

16. The apparatus of claim 1, further comprising a unit for orienting containers and for transferring said containers in a given orientation to a downstream device, wherein said device is a constituent of said unit.

17. The apparatus of claim 1, further comprising a labeling machine having a labeling unit, wherein said device is a constituent of said labeling machine.

18. A method comprising placing first containers on container holders in a first group of container holders, placing second containers on container holders in a second group of container holders, using a first rotary drive, causing controlled rotation of the container holders in the first group of container holders as the container holders traverse an orientation segment, using a second rotary drive that is separate from said first rotary drive, causing controlled rotations of the containers in the second group of container holders as the container holders traverse the orientation segment, wherein said container holders in said first group extend along a direction of conveyance, wherein said container holders in said second group extend along said direction of conveyance, wherein each of said containers in said second group is adjacent to a container in said first group.

* * * * *